Sept. 15, 1959 L. R. HUSSA 2,903,911
APPARATUS FOR POWER TAKE OFF
Filed March 17, 1958

INVENTOR.
LEOPOLD R. HUSSA
BY
BUCKHORN, CHEATHAM & BLORE

ATTORNEYS

United States Patent Office 2,903,911
Patented Sept. 15, 1959

2,903,911

APPARATUS FOR POWER TAKE OFF

Leopold R. Hussa, Portland, Oreg.

Application March 17, 1958, Serial No. 722,089

2 Claims. (Cl. 74—665)

This invention relates to power take off apparatus and particularly to power take off apparatus by which power may be intermittently transmitted from the apparatus to a device to be driven.

It is a main object of the invention to provide a power take off apparatus adapted for securement to the end of a driving shaft and including sheave means which is intermittently driven and other sheave means which is constantly driven.

Another object of the invention is to provide an apparatus of the class described having a novel means for operating the clutch unit of the apparatus.

A further object of the invention is to provide an apparatus of the type just described in which there is an operating member which may be selectively disposed in various circumferential positions about the apparatus.

Various other objects of the invention will be apparent from the following description taken in connection with the accompanying drawings wherein.

Figure 3:
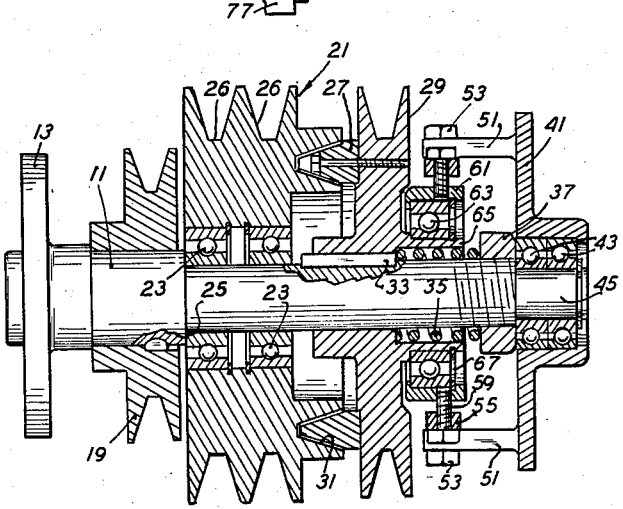
Fig. 3 is a horizontal section taken along line 3—3 of Fig. 2.

Referring to the accompanying drawings, the power take off apparatus includes a driven shaft 11 having a bolting flange 13 formed at one end for securement to the flywheel 15 of a driving shaft 17. Fixedly mounted on the shaft 11 adjacent the left-hand end thereof as the parts are shown in Fig. 3 is an auxiliary sheave 19 which is constantly driven by the driven shaft 11 and which may transmit power to another device which is to be driven at all times. A main sheave unit 21 is rotatably mounted on the shaft 11 by means of ball bearings 23 and is disposed against a shoulder 25 and so is maintained in a fixed axial position relative to the shaft 11. The sheave unit 21 is shown as having a pair of grooves 26 formed therein for reception of belts for driving other devices. A single groove could be provided if desired.

The sheave unit 21 is driven by the shaft 11 when a friction clutch member 27 on a clutch sheave 29 engages within a groove 31 formed in the right-hand end of the sheave unit 21. The clutch sheave 29 is slidably but non-rotatably mounted on the shaft 11 by means of a key 33 and is normally urged to the left, so that the friction clutch member 27 engages the walls of the groove 31, by means of a compression spring 35. The compression spring abuts against a nut 37 threaded on the shaft 11 adjacent the extreme right-hand end portion thereof.

Figure 1:
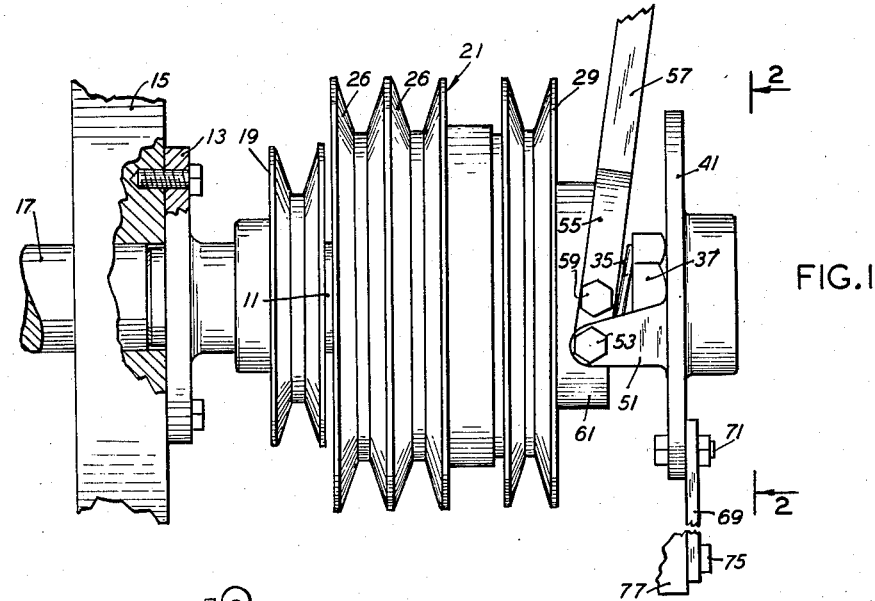
Fig. 1 is a side view in elevation of a power take off apparatus of the present invention secured to a driving member.

An operating means is provided for causing the clutch, made up of the friction clutch member 27 and the walls of the groove 31, to engage and disengage and this operating means includes the compression spring 35. The operating means also includes a mounting member 41 which is rotatably mounted by means of bearings 43 on the right-hand reduced end portion 45 of the shaft 11. The mounting member 41 has a pair of ears 51 projecting toward the left, as the parts are shown in Fig. 3, and these ears are connected by pivot bolts 53 to the lower end portions of a yoke 55 of an operating member 57. A second pair of pivot bolts 59 passes through the yoke 55 in spaced relation above the lower ends thereof as is shown in Fig. 1 and thread into a ring 61 which is mounted by means of a ball bearing 63 on a tubular extension 65 of the clutch sheave 29. A snap ring 67 holds the bearing in place within the ring, and holds the ring on the tubular extension 65.

Because of the spacing of the pivot bolts 59 and 53, it is apparent that movement of the operating member 57 to the right as the parts are shown in Fig. 1 will serve to retract the clutch sheave 29 to disengage the clutch to allow the sheave unit 21 to idle. At this time, however, the sheave 29 is permitted continued rotation because of the anti-friction connection at 63 between the sheave unit and the operating members 55, 57.

Figure 2:
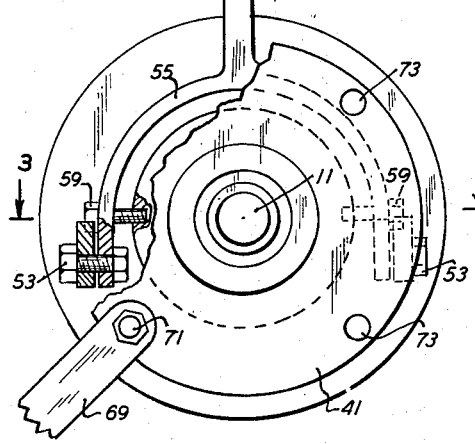
Fig. 2 is an end view of the apparatus taken in the direction of the arrows 2—2 in Fig. 1, with parts broken away for convenience in illustration.

A stabilizing arm 69 is connected at one end by a nut and bolt 71 in one of a plurality of holes 73 formed in the mounting member 41 as is clearly apparent from Fig. 2, and is connected at its opposite end by a bolt 75 to a stationary member 77 which may be a frame for the prime mover. Although three holes are shown in Fig. 2 and a fourth has been cut away, the mounting piece could be provided with more or less holes as desired. In any event, by rotating the mounting piece circumferentially and selectively connecting the stabilizing arm 69 to the mounting piece, the handle portion 67a of the operating member can be disposed in the vertical position shown in Fig. 2 or in a horizontal position at the right or a horizontal position to the left or a depending vertical position. This is of great importance when the power take off device is used in confined quarters since it is not known prior to installation just where proper clearance will be available.

It is further pointed out that the mounting member 41 is retained in place on the shaft 45 because the mounting piece is connected to the yoke and the yoke is connected to the ring 61 and the ring is connected to the sheave unit 29 and the sheave unit 29 is retained by the spring 35 and the nut 37. With this arrangement, the yoke and mounting piece can be readily removed when required without requiring the disassembly of any of the other parts of the apparatus.

Having described the invention in what is considered to be the preferred embodiment thereof, it is desired that it be understood that the invention is not to be limited other than by the provisions of the following claims.

I claim:

1. A power take off device comprising a driven shaft, means at one end of said driven shaft for securing said driven shaft to a driving shaft, a first sheave means rotatably mounted on said driven shaft in a fixed axial position, a clutch unit slidably but nonrotatably mounted on said driven shaft on the side of said sheave means remote from said one end of said shaft, operating means rotatably mounted on the other end of said shaft for moving said clutch unit toward and away from said sheave means including a mounting member mounted in an axially fixed position on said shaft for rotation of said shaft relative to said mounting member, said mounting member having a pair of ears projecting toward said clutch unit, an operating member supported by said mounting member and having one end in the form of a yoke pivotally connected to said ears, antifriction means pivotally connected to said yoke in spaced relation to the pivotal connection between said yoke and said ears so that movement of said operating member in a plane at right angles to the pivotal axis of said yoke will move said anti-friction means along said shaft, means providing for movement of said clutch unit toward said sheave means upon such movement of said anti-friction means, and detachable means for holding said mounting member from rotating with said driven shaft.

2. A power take off device comprising a driven shaft, means at one end of said driven shaft for securing said driven shaft to a driving shaft, a first sheave means rotatably mounted on said driven shaft in a fixed axial position, a clutch unit slidably but nonrotatably mounted on said driven shaft on the side of said sheave means remote from said one end of said shaft, operating means rotatably mounted on the other end of said shaft for moving said clutch unit toward and away from said sheave means including a mounting member mounted in an axially fixed position on said shaft for rotation of said shaft relative to said mounting member, an operating member having one end pivotally connected to said mounting member, anti-friction means pivotally connected to said operating member in spaced relation to the pivotal connection between said operating member and said mounting member so that movement of said operating member in a plane at right angles to the pivotal axis of said operating member will move said anti-friction means along said shaft, means providing for movement of said clutch unit upon such movement of said anti-friction means, and means for holding said mounting member from rotating with said driven shaft, said holding means and said mounting means having means providing for connection of the two in different circumferential positions of said operating member relative to said shaft to enable said operating member to be disposed in a desired spacial position.

References Cited in the file of this patent
UNITED STATES PATENTS

| | | |
|---|---|---|
| 833,982 | Snyder | Oct. 23, 1906 |
| 909,768 | Donaldson | Jan. 12, 1909 |
| 1,266,189 | Younie | May 14, 1918 |
| 2,133,228 | Vesconte | Oct. 11, 1938 |